US009787822B1

(12) United States Patent
Holland

(10) Patent No.: US 9,787,822 B1
(45) Date of Patent: Oct. 10, 2017

(54) TRACKING TEXT MESSAGES WITH REMINDERS

(71) Applicant: Amazon Technologies, Inc., Reno, NV (US)

(72) Inventor: Jamie Marie Holland, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/293,953

(22) Filed: Jun. 2, 2014

(51) Int. Cl.
H04M 1/725 (2006.01)
H04W 4/14 (2009.01)
H04W 4/12 (2009.01)

(52) U.S. Cl.
CPC ... *H04M 1/72566* (2013.01); *H04M 1/72552* (2013.01); *H04W 4/12* (2013.01)

(58) Field of Classification Search
CPC ......... H04M 1/72566; H04M 1/72552; H04W 4/12
USPC ............... 455/466, 566, 412.2; 709/204, 206
See application file for complete search history.

(56) References Cited

U.S. PATENT DOCUMENTS

| 7,327,834 | B1* | 2/2008 | Hiers ...................... H04L 12/66 379/88.13 |
| 2006/0208861 | A1* | 9/2006 | Stroupe ................ G06Q 10/109 340/309.7 |
| 2007/0124371 | A1* | 5/2007 | Desai et al. .................. 709/204 |
| 2007/0174404 | A1* | 7/2007 | Hui ...................... G06Q 10/109 709/207 |
| 2008/0161027 | A1* | 7/2008 | Benco .................... G06Q 10/10 455/466 |
| 2009/0029724 | A1* | 1/2009 | Hardy .................. G06Q 10/109 455/466 |
| 2009/0106365 | A1* | 4/2009 | Drory .................. G06Q 10/107 709/206 |
| 2009/0134991 | A1* | 5/2009 | Shuart .......................... 340/457 |
| 2009/0183096 | A1* | 7/2009 | Edelen et al. ................ 715/764 |
| 2009/0235280 | A1* | 9/2009 | Tannier et al. ............... 719/318 |
| 2010/0103779 | A1* | 4/2010 | Kakirde ............... G06Q 10/109 368/10 |
| 2010/0159978 | A1* | 6/2010 | Sierawski ......... H04M 1/72519 455/550.1 |
| 2010/0223089 | A1* | 9/2010 | Godfrey et al. .................. 705/9 |

(Continued)

*Primary Examiner* — Nathan Taylor
(74) *Attorney, Agent, or Firm* — Robert C. Kowert; Meyertons, Hood, Kivlin, Kowert & Goetzel, P.C.

(57) ABSTRACT

Methods and devices for associating reminders with text messages of a text messaging application are disclosed. A text message is displayed via a display of a device. A user-selectable interface such as the user interface of a text message application for mobile devices is provided for a user to associate a reminder with the displayed text message. For example, a user may tap on a touch sensitive display of the mobile device that is displaying the message to instruct an association between a reminder and the text message. The input may be received by the device and an association between the text message and a reminder generated. The reminder associated with the text message may be activated at a scheduled time. The reminder functionality may be integrated with other applications, programmatically or via user-selectable prompts integrated into the text message application user interface. Messages may be flagged or tagged.

19 Claims, 9 Drawing Sheets

(56) References Cited

U.S. PATENT DOCUMENTS

| | | | |
|---|---|---|---|
| 2010/0231364 A1* | 9/2010 | Laine | H04L 12/1895 340/309.7 |
| 2011/0047483 A1* | 2/2011 | Low | H04L 12/5875 715/752 |
| 2011/0076989 A1* | 3/2011 | Lynch | H04M 1/72547 455/412.1 |
| 2011/0106892 A1* | 5/2011 | Nelson et al. | 709/206 |
| 2011/0239158 A1* | 9/2011 | Barraclough et al. | 715/808 |
| 2011/0320548 A1* | 12/2011 | Jonsson | 709/206 |
| 2012/0143961 A1* | 6/2012 | Jonsson | 709/206 |
| 2012/0239761 A1* | 9/2012 | Linner et al. | 709/206 |
| 2013/0007648 A1* | 1/2013 | Gamon et al. | 715/771 |
| 2013/0110940 A1* | 5/2013 | Pasquero | H04M 1/72552 709/206 |
| 2014/0070945 A1* | 3/2014 | Dave | G08B 21/24 340/540 |
| 2014/0173009 A1* | 6/2014 | Denise | G06Q 10/107 709/206 |
| 2015/0045004 A1* | 2/2015 | Varadharajan | 455/412.2 |
| 2015/0207926 A1* | 7/2015 | Brown | H04M 1/72597 455/414.1 |

* cited by examiner

TRACKING TEXT MESSAGES WITH REMINDERS

BACKGROUND

Messaging applications, such as text messaging applications and messaging tools of other applications have enjoyed increased market share across computing devices generally, but especially for mobile computing devices. Messaging can provide a comparatively quick and effective way to perform asynchronous or synchronous communications, even in comparison to e-mail.

Perhaps due to their simple nature, messaging applications and/or messaging tools of other applications may be created with fewer features than are provided in other types of communication applications or tools such as e-mail, for example. The small foot-print of text messaging applications has made them a preferable communication choice for devices with limited memory and processing power. However, the tradeoff for a small footprint design choice can be reduced or limited functionality. One example of reduced features of messaging is a reduced message size when compared to e-mail or voice messages for example. For example, the short message service (SMS) is limited to 140 octets per text message. The smaller text message size, in combination with the asynchronous nature of some messaging applications may contribute to less accurate and/or ephemeral communications that may have a greater likelihood of being forgotten, misunderstood and/or left unorganized.

Additionally, messaging applications may limit the number of text messages kept in the message history, for example, text messaging applications on portable communication devices with reduced available memory space. These and other limitations may limit the ability of text messages of the text messaging application to successfully be used as reminders for the content of the text messages.

Figure 1:
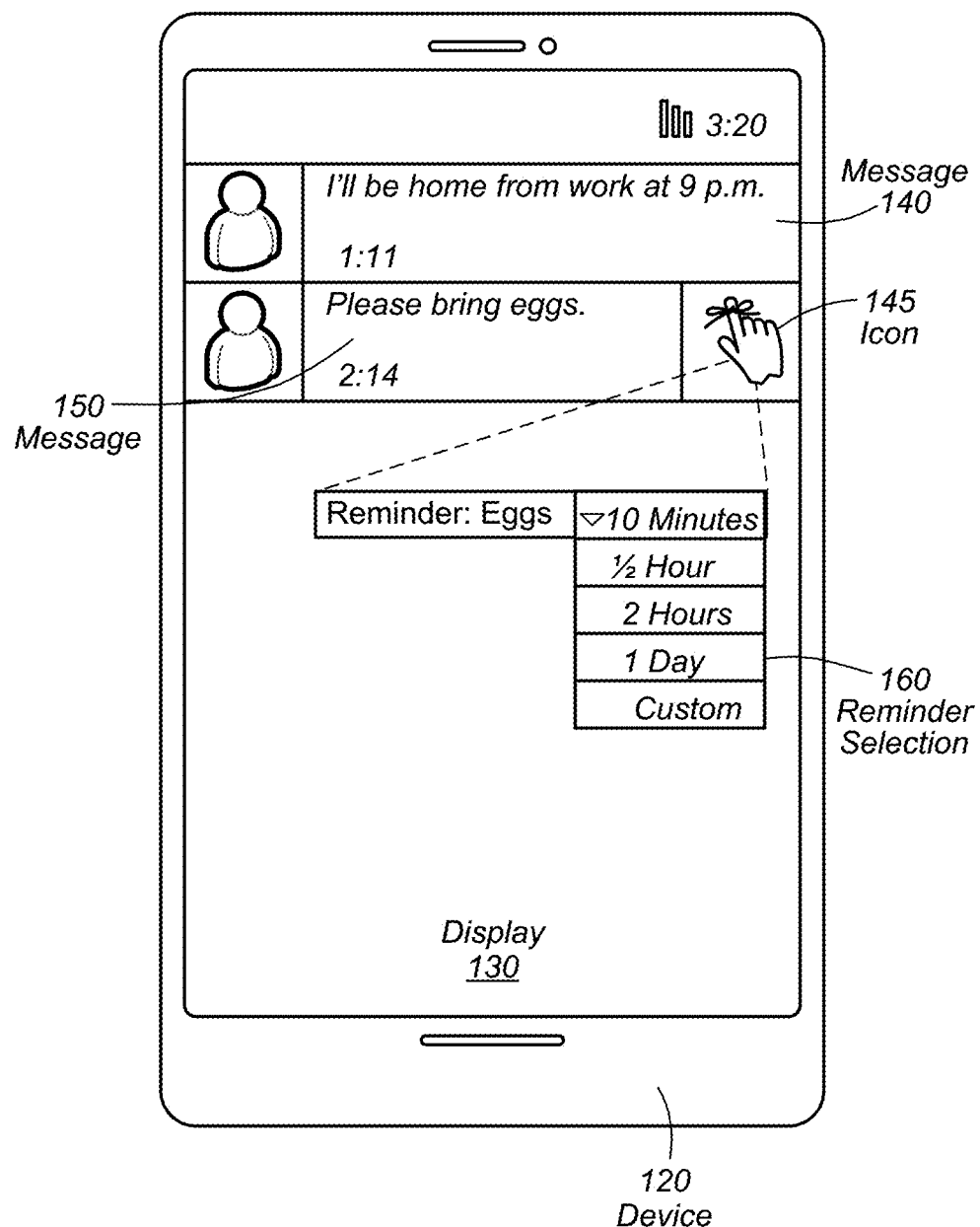
FIG. 1 illustrates a mobile device displaying a user interface of a reminder-enabled text messaging application according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a device, system and methods for associating a reminder with a text message of a text messaging application such that the reminder associated with the text message is activated at a scheduled time are described. A text message may be received at one device from another device. The text message may be displayed by a user interface of the device that received the text message. The device that received the text message may provide a user interface that is configured to receive input from a user indicating an instruction to associate a reminder with the displayed text message. For example, a user may tap on a touch sensitive display of a mobile device that is displaying the text message to instruct creation of an association between the displayed text message and a reminder.

The device may, in response to the instruction, generate a reminder and associate the reminder with the text message. The reminder may be associated with a scheduled time for activating the reminder. For example, the scheduled time may be a default time or time period, or a configurable time or time period. In some embodiments, the reminder may be customized, for example, populated with text from the text message, labeled or titled by the user or integrated with features from another application. The reminder may be activated at the scheduled time, for example, to remind the user of the text message or something corresponding to the text message. Reminders may be rendered in numerous various ways, for example via e-mail, text message application, audibly, etc. Text messages may be tagged or flagged in some embodiments, such that the text messages may be searched, filtered or sorted, for example.

Text messaging is applicable to numerous types of portable, non-portable, wired and wireless devices. For example, text message applications are available for PCs, laptops, tablets, mobile phones and the like. The embodiments described herein may be applied to any of various types of text messaging components or applications built using any of various protocols, for example, short message service (SMS) and multimedia messaging service (MMS). In embodiments, a text messaging application may be configured to send and receive messages of a reduced size, for example, 140 octets.

FIG. 1 illustrates a mobile device displaying a user interface of a reminder-enabled text messaging application according to one embodiment. Device 120 is illustrated as a portable communications device with display 130. Any of various types of user interfaces may be incorporated into the devices described herein without departing from the scope of the disclosure. For example, various types of touch sensitive displays (e.g. resistive touchscreen panel displays, capacitive touchscreen panel displays, surface capacitance displays, etc.) or voice recognition interfaces may be used.

Figure 2:
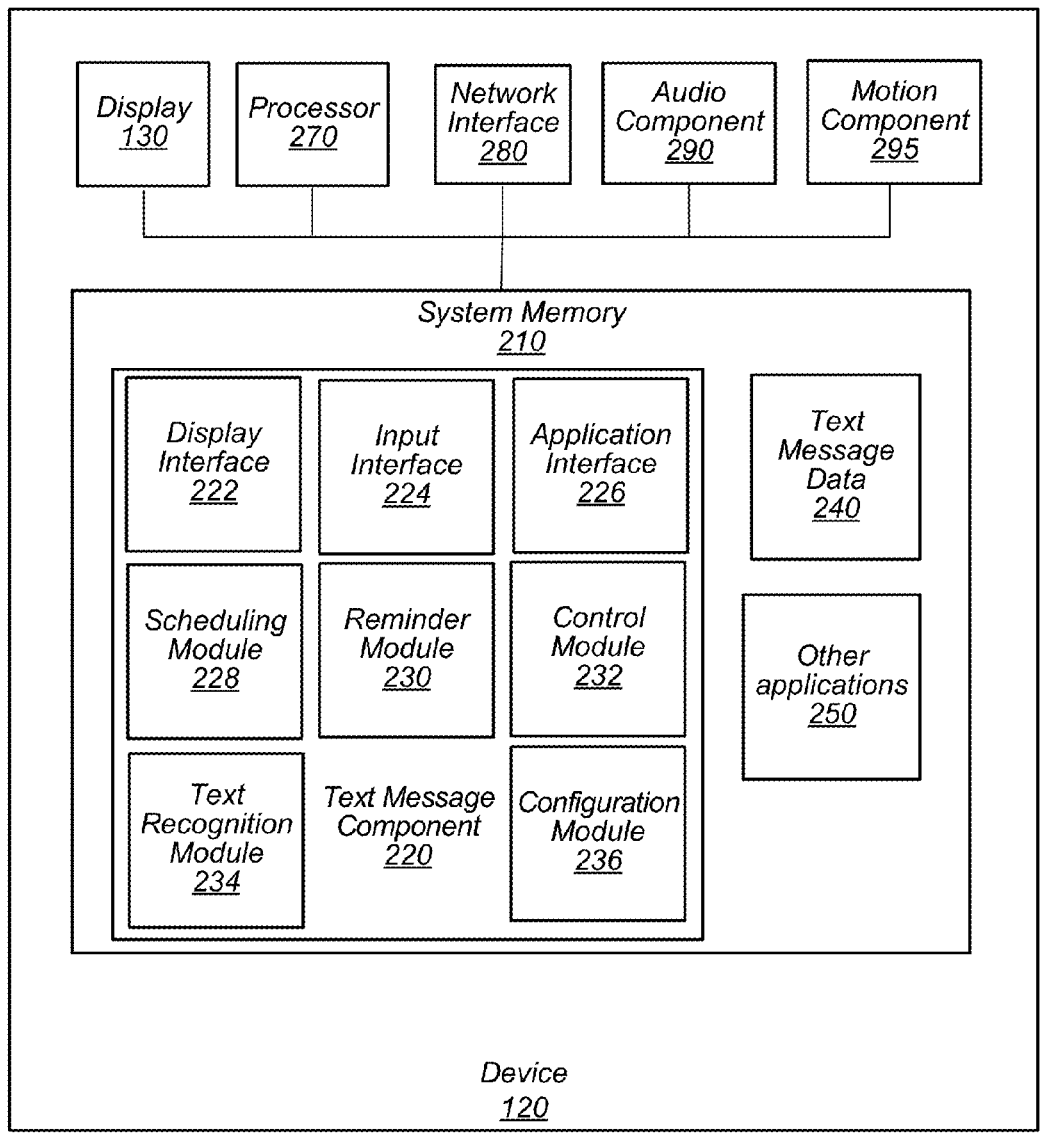
FIG. 2 illustrates a logical diagram of one embodiment of a device with a text message component configured to perform the methods described herein.

In FIG. 1, device 120 is illustrated with display 130 displaying a user interface of a text messaging application in accordance with embodiments of the invention. In some embodiments, the text messaging application of device 120 may comprise a text messaging component such as the text messaging component 220 illustrated in FIG. 2. As illustrated in FIG. 2, the text messaging component 220 may be configured to interact with other components of the device, for example the display 130, processor 270, network interface 280 and audio component 290 illustrated in FIG. 2. The components illustrated in FIG. 2 may be configured to operate together to perform the process of associating reminders with text messages illustrated in FIG. 3.

In FIG. 1, display 130 is illustrated displaying message 140 and message 150. In some embodiments, message 140 may be a text message created by and sent from device 120 and in other embodiments, message 140 may be a text message created by and received from a device other than device 120, for example, a device of another user. Message 150 is illustrated as a text message that is responsive to the message 140, either from device 120 or from another device or user, accordingly.

In some embodiments, the user interface may comprise a user interface element such as a reminder icon to facilitate an association between a text message and a reminder. In some embodiments, a selectable icon may always be displayed with a text message while in other embodiments, a selectable icon may be displayed opportunistically. For example, the content of a text message may be analyzed such that a reminder opportunity is recognized and an icon opportunistically displayed along with the text message. In yet other embodiments, an icon may appear when a user presses, taps, hovers, or otherwise indicates selection of a text message. The device may be configured to recognize or accept other forms of input, such as audible input (e.g., voice recognition), in embodiments.

Device 120 is illustrated with icon 145 that corresponds to message 150. Icon 145 is illustrated as a hand with a knot on a finger, indicating that a reminder may be associated with the text message. In some embodiments, a user may select to associate a reminder with a message by tapping on the icon 145 displayed via display 130. In the illustrated embodiment, selection of the icon 145 has caused display of reminder selection 160. In the illustrated embodiment, a user has tapped on the icon 145 and the reminder selection 160 user interface element has been displayed in response to selection of the icon 145.

In FIG. 1, reminder selection 160 is composed of multiple selectable and editable interface elements. One element, containing the content "Reminder: Eggs" may be part of the reminder selection 160. In some embodiments, this part of the reminder selection user interface element may be referred to as the content portion of the reminder selection user interface element. In some embodiments, the content portion of the reminder selection user interface element may be automatically generated, for example by the text messaging application or component analyzing the textual content of the text message 150. In other embodiments, the user interface may be configured to provide an opportunity for the user to enter or customize this portion of the reminder selection 160.

Another element of the illustrated reminder selection 160 is the part that lists multiple amounts of time (e.g., 10 minutes, ½ hour, 2 hours, 1 day or customer). In the illustrated embodiment, a user of the device 120 has selected to change the amount of time associated with the reminder by tapping on the time portion element of the reminder selection and a list of alternative times has been presented. Any one of the time options may be selected as the scheduled time for the reminder associated with the text message.

FIG. 2 illustrates one embodiment of a text message component configured to perform the methods described herein. In the illustrated embodiment, the text message component 220 is a component stored as program instructions in the system memory 210 of device 120 along with text message data 240 and other applications 250. The program instructions stored in system memory 210 may be processed by processor 270 of device 120. Execution of the program instructions may cause display of a user interface on display 130. The program instructions may be configured to receive user input from a user via the display 130 or other type of user interface such as audible commands via audio component 290 or motion activated commands (e.g., shaking) via a motion component 295 (e.g., a gyro, accelerometer).

Figure 8:
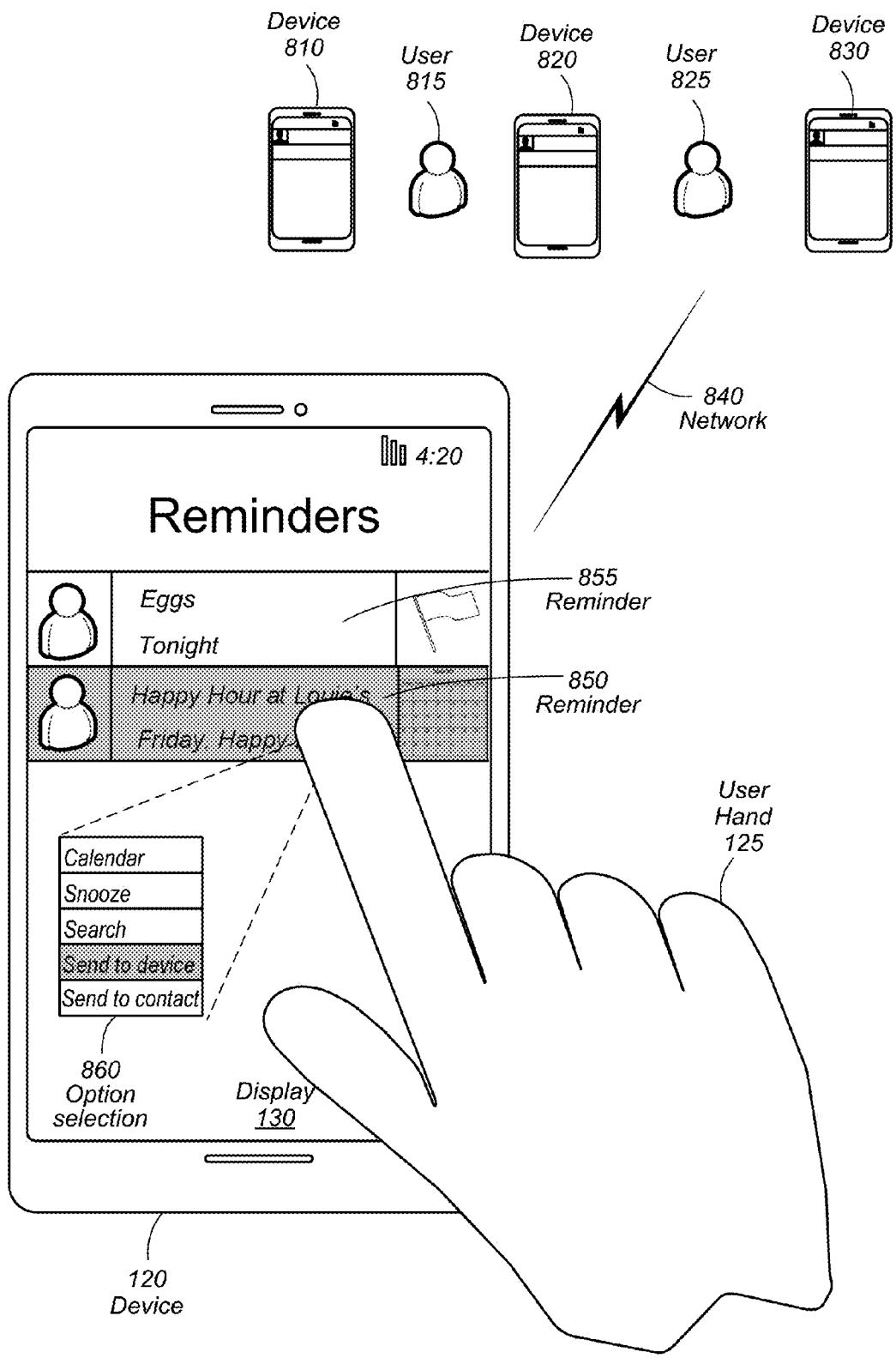
FIG. 8 illustrates a reminder interface for a mobile device, according to one embodiment.

In embodiments, the program instructions stored in system memory 210 may cause sending and receiving of text messages, instructions or other types of communication via network interface 280. Network interface 280 may comprise an interface to any type of network including, but not limited to wired networks such as copper (e.g., plain old telephone (POTS)) or fiber optic networks or wireless networks such as wireless personal area networks, local area networks, metropolitan area networks, wide area networks, cellular networks or global area networks (e.g., satellite-based networks). Network interface 280 may facilitate transfer of text messages between device 120 and other devices, as illustrated in FIG. 8 for example.

An application, such as a text messaging application may comprise text message component 220, although text message component 220 may be integrated with other components (e.g., e-mail components, word processing components, image processing components, camera components, etc.).

In FIG. 2, various modules 222-236 of text message component 220 are illustrated as part of text message component 220. In various other embodiments, the various components may be arranged otherwise. For example, some or all of modules 222-236 may be part of other components or other applications. One, some or all of the modules 222-236 may be implemented entirely or partially on a single device or across multiple devices. For example, text recognition module 234 may be implemented wholly or partially on one or more servers while reminder module 230 may be implemented wholly or partially on device 120. All portions of the text message component 220 may be implemented in various different ways and across various different devices including portable and non-portable communication devices, servers, displays, etc. These devices may include various components such as those illustrated in FIG. 9, described below.

As previously described, a text message component may be configured to send and receive text messages. The text messages may be associated with reminders that can be activated at a scheduled time. Various aspects of the reminders may be determined based upon default settings, configurations or customizations by the user, for example. Text message component 220 may store, retrieve or otherwise interact with text message data 240 and/or other applications such as other applications 250.

The modules illustrated in FIG. 2 facilitate creation, customization and management of text messages and reminders associated with text messages in accordance with the embodiments described herein. In some embodiments, the modules illustrated in FIG. 2 perform one or more functions of the processes illustrated in FIGS. 3-8.

FIG. 2 illustrates that text message component 220 includes reminder module 230. Reminder module 230 may be configured independently of or among the other modules of the text message component 220 to provide various functionality associated with reminders for text messages. For example, reminder module 230 may be coordinately configured to operate in conjunction with display interface 222 and input interface 224 to instruct a display (e.g., display 130 of device 120) to display interface elements used to associate reminders with text messages as illustrated in FIGS. 3-8 for example. These same components may also be coordinately configured to receive input such as user input or other instructions associated with text messages and reminders. In some embodiments, reminder module 230 may generate a reminder and associate the reminder with a text message by creating a link between the generated reminder and the text message according to input received via display interface 222 and user interface 224. Reminder module 230 may also perform other reminder-related functionality, such as customizing reminders, sending reminders, searching for reminders, searching text messages based on reminders, filtering text messages or reminders and the like.

Display interface 222 and input interface 224 may function independently or may be coordinately configured to display output associated with text messages and reminders associated with or linked to the text messages and to receive input such as instructions from a user associated with text messages and reminders. The display interface 222 and the input interface 224 may be configured to coordinate with the other modules of the text message component or with other applications to display output and receive input (e.g., via display 130 of device 120). For example, in order to customize an activation time for a reminder associated with a text message, the scheduling module 228, in some embodiments, may instruct display of a time selection widget or tool from another application via the application interface module 226. The scheduling module 228 may send instructions, via the display interface 222, instructing display of the time selection tool and receive, via input interface 224 the selected time of activation. FIG. 1 illustrates a time selection interface element as part of the reminder selection 160, for example. In some embodiments, selection of the "Custom" option of reminder selection 160 may result in display of a time and date selection widget from a calendar application, in some embodiments. Such integration may facilitate coordination of reminders and other events on the calendar, for example.

Figure 4:
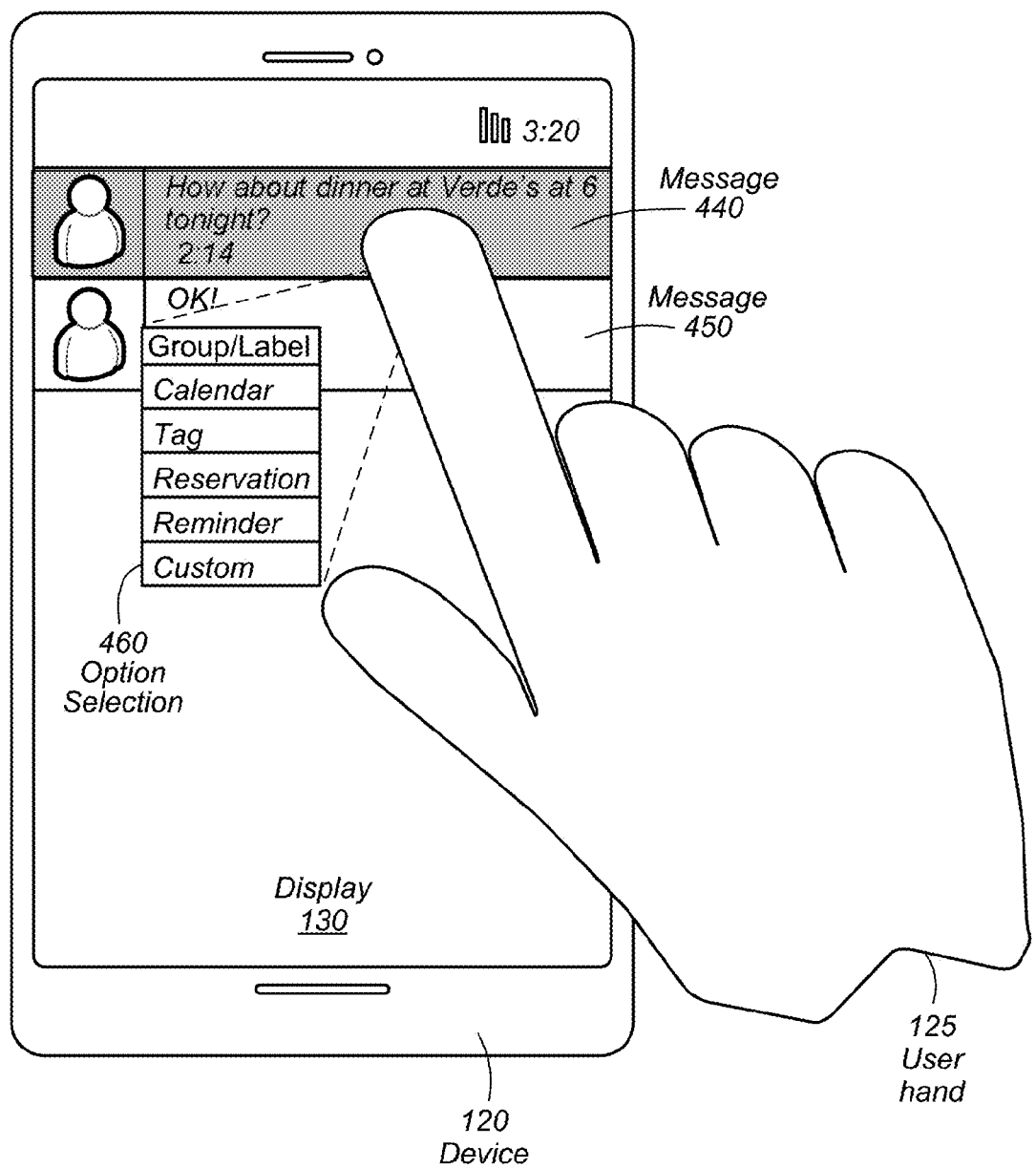
FIG. 4 illustrates a text messaging application for a mobile device, according to one embodiment.

Display interface 222 and input interface 224 may also be configured to support association of text messages with tags or flags, in some embodiments. For example, input interface 224 may be configured to respond to user input by linking a flag or a tag (e.g., one of the options in option selection 460 of FIG. 4 is the tag option) with the text message indicated by the user input. Either or both of the flag or tag and the association to a text message may be stored in text message data 240, in embodiments. In some embodiments, associations of flags or tags with a text message may be used to sort, filter, group or otherwise manage the text messages. Tags or flags may be customizable in various embodiments, with custom text or colors, for example.

Other modules may also interact with the display interface and input interface. For example, the display interface 222, input interface 224, and configuration module 236 may be coordinately configured such that configuration setting options may be presented via the display and user input selecting or instructing a particular setting may be received. For example, in FIG. 1, the reminder selection 160 has been configured via configuration settings adjusted by the user to display the various time options 10 minutes, ½ hour, 2 hours, 1 day and custom. The configuration module 236 may provide much of this functionality, in embodiments.

Figure 6:
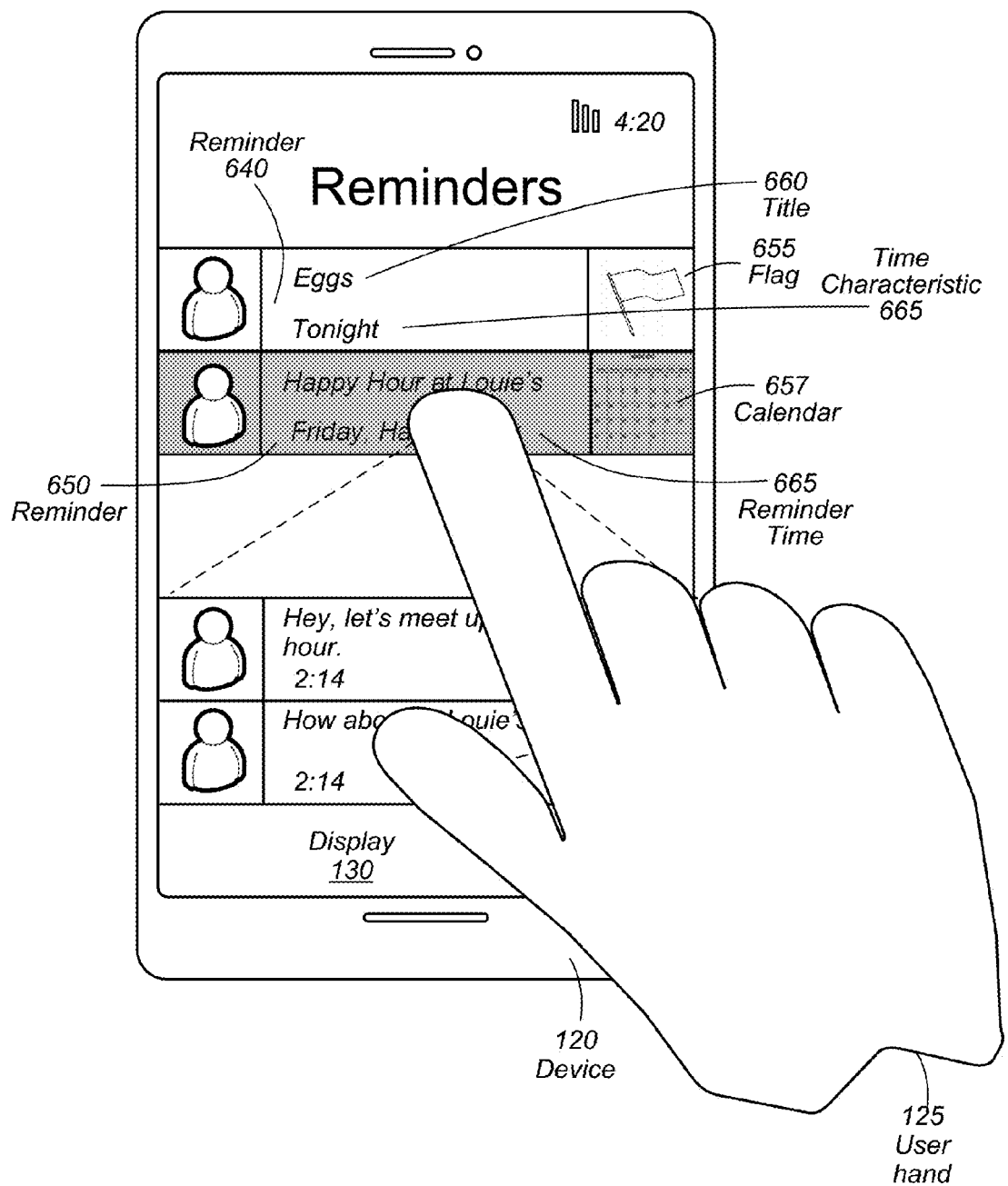
FIG. 6 illustrates a reminder interface for a mobile device, according to one embodiment.

Text message component 220 is illustrated with control module 232. In embodiments, control module 232 may direct activation of reminders, at a scheduled time or on a particular device, for example. FIG. 6 illustrates two reminders that have been activated by control module 232, for example.

Text recognition module 234 may be configured to recognize text and patterns of text (e.g., from the content of a text message). In some embodiments, text recognition module 234 may apply any of various machine learning techniques to recognize patterns among the content of the text messages. For example, in one embodiment, FIG. 1 illustrates message 140 that was created via and sent from device 120 to another user's device (not illustrated). Message 150 is a responsive message received from the other user's device. In some embodiments, text recognition module 234 may analyze the text of one or both of the text messages 140, 150 to recognize patterns. The recognized patterns may be used to provide any of various functionality, such as suggesting automated responses, prefilling fields of other applications launched in association with the text message component and recognizing opportunities to provide additional functionality, such as creating the textual content for a reminder, for example.

In the illustrated embodiment, text recognition module 234 recognized the text "Please bring eggs" as a type of textual pattern making a request. Logic associated with the text recognition module 234 may recognize the text message 150 as an opportunity for a reminder. Based on the recognized opportunity, the text recognition module 234 may instruct the display interface 222 to display icon 145 as an indication that a reminder may be associated with text message 150.

FIG. 1 also illustrates that when the input interface receives an indication that icon 145 has been selected by the user, the reminder selection 160 may be displayed. In this particular embodiment, the word "Eggs" has been recognized as the subject of the text message 150 and placed into the content portion of the reminder selection 160 by coordination between text recognition module 234 and reminder module 230 and instructed for display via the display interface 222. In the illustrated embodiment, input interface 224 may receive an indication of the particular time selected by the user from the reminder selection 160 and the reminder may be saved. For example, the reminder may be saved to a storage area illustrated as text message data 240. The control module 232 may instruct activation of the reminder at the scheduled time (e.g., illustrated in FIG. 6).

FIG. 2 illustrates that other applications 250 may be stored as program instructions in system memory 210 of device 120. As described herein, text message component 220 may incorporate or integrate functionality from other applications 250 (programmatically, via application interface 226, for example) and the other applications 250 may incorporate or integrate functionality from the text message component (e.g., reminders associated or created based upon text messages).

Figure 3:
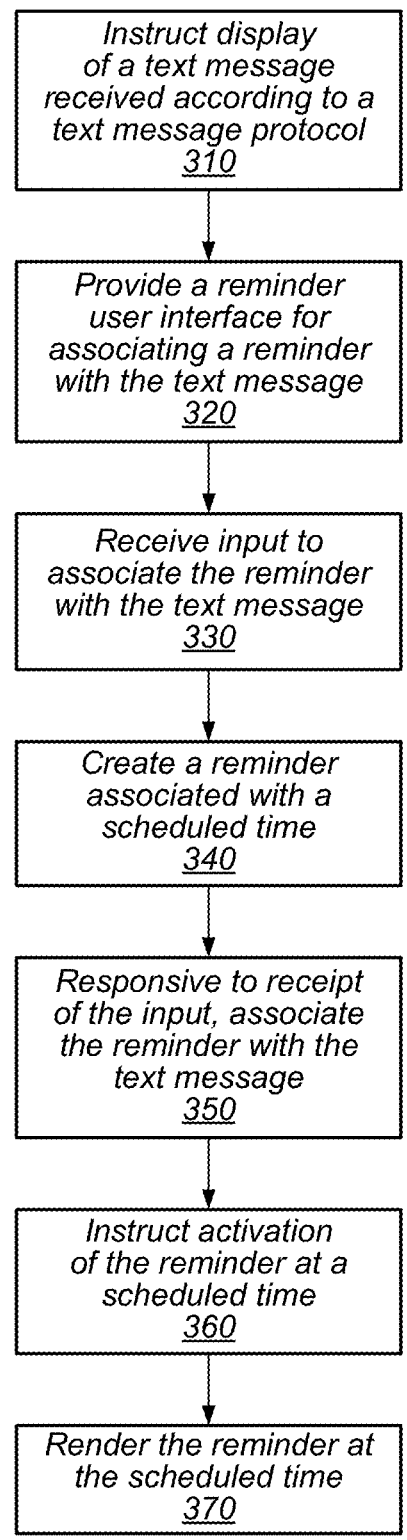
FIG. 3 is a flow diagram of a process for associating reminders with text messages of a text message application, according to some embodiments.

As described above, a text messaging component or application may include various modules for facilitating association of reminders with text messages. The modules may support reminder generation, association, customization and integration, for example. FIG. 3 is a flow diagram of a process for associating reminders with text messages of a text message application, according to some embodiments. The processes illustrated in FIG. 3 may be performed by one or more of the modules 222-236 of text message component 220, in embodiments.

FIG. 3 illustrates, at 310, that display of a text message received according to a text message protocol may be instructed. For example, text message component 220 may send instructions, via display interface 222 to display a text message on display 130 of device 120.

As indicated at block 320, a reminder user interface may be provided for associating a reminder with the text message. For example, in some embodiments, the device may respond to a user tapping on the displayed text message by responsively displaying a menu or other type of selectable user interface element. FIG. 4 illustrates such an embodiment where the option selection 460 provides the selectable options of group/label, calendar, tag, reservation, reminder and custom. In another example, a device (e.g., via a text pattern recognition module) may recognize a reminder opportunity and display an icon inviting the user to request a reminder by tapping on the icon (e.g., FIG. 5). In another embodiment, an audio component 290 may provide an audible reminder user interface that may play the content of the text message audibly and recognize a responsive voice command from the user instructing association of the text message with a reminder. The reminder user interface may include display interface 222, input interface 224 and/or audio component 290 in various embodiments. The audio component 290 may include hardware such as a microphone and speaker along with software to support the described functionality. The invasiveness of such opportunistic functions may be configurable, in embodiments.

Block 330 illustrates that input to associate the reminder with the text message may be received. For example, FIG. 1 illustrates that icon 145 has been selected by the user tapping on the icon 145. Input interface 224 may receive an indication of the selection from the display interface 222 and pass the indication of the selection to reminder module 230 as a request to associate a reminder with the text message. In other embodiments, selection of the text message itself (e.g., FIG. 4) may result in a request for an association being sent to reminder module 230. As described above, an audible prompt such as a voice command may also act as input for requesting association of a reminder with a text message, in embodiments.

Block 340 illustrates that a reminder may be created that is associated with a scheduled time. For example, reminder module 230 may receive a request to associate a reminder with a text message and in response to the request, create or generate a reminder. In some embodiments, reminder module 230 may generate a reminder in response to the request to associate a reminder with the text message and store the reminder in the text message data 240.

In some embodiments, creation and association of a reminder with a text message may be initiated or launched from an application or component other than the text message component. For example, user interaction with a separate reminder application may initiate creation of the reminder.

Reminders may be generated in various configurations. For example, a reminder may be created that has a time characteristic. The time characteristic may indicate a time or time period at which the reminder may be activated. In some embodiments, a reminder may be generated with a default time period characteristic, for example, 1 hour, 1 day and the like. In other embodiments the default time may be 5 pm or 6 am, for example.

The time characteristic may be determined according to user-configurable settings, in some embodiments. For example, configuration module 236 may provide functionality that configures the time characteristic according to instructions based upon user input received via display interface 222 and input interface 224. For example, a user may, via the user interface of device 120, configure time characteristic settings such that the options illustrated in reminder selection 160 of FIG. 1 are changed to 30 minutes, 1 hour and 1 week.

In another embodiment, the time characteristic may be customizable for each reminder. For example, selection of the custom option from the reminder selection 160 in FIG. 1 may result in display of a calendar or clock tool that facilitates selection of a custom time for activation of the reminder. A user may instruct selection of a custom time for activation of the reminder by interacting with the calendar or clock tool via the user interface. In some embodiments, the calendar or clock tool may be built into the text message component or may be accessed from another application (e.g., other applications 250) programmatically, for example.

Reminders may be created in various configurations so as to support integration with other types of devices and systems. For example, reminders may be created with a particular syntax or in accordance with a particular application programming interface to facilitate interoperability for sync and send/receive operations to other applications, devices or systems.

Additional customization of reminders may be performed, according to embodiments. For example, as illustrated in FIG. 1, the content of a text may be used to auto-populate the content of the reminder. In FIG. 1, the subject of message 150, i.e., eggs, was recognized and used to auto-populate the content portion of the reminder selection 160. In another embodiment (e.g., FIG. 6, reminder 650) an indication of time that appears as content in a text message may be used to populate the time characteristic of the reminder.

Block 350 illustrates that an association between the reminder and the text message may be created in response to receipt of the input. For example, the reminder module 230 may receive a request to associate a text message with a reminder and create an association or link between the reminder generated at block 340 and the text message associated with the request. The link may be stored in the text message data 240, in embodiments. In some embodiments, the association may be stored as meta-data of the text message, as an entry in a table or database or as part of some other data structure.

Activation of the reminder may be instructed at a scheduled time, as indicated at block 360. For example, the control module 232 may instruct activation of the reminder at the time associated with the reminder. In some embodiments, activation may be instructed by a control module that is not part of the text message component. For example, activation may be instructed by another module of another application. In some embodiments, a notification application or component, separate from the text message component may instruct activation of the reminder. For example, a calendar application may instruct activation of the reminder.

Block 370 illustrates that the reminder may be rendered at the scheduled time. FIG. 6, described below, illustrates a rendering of two reminders 640 and 650, for example. The rendering of a reminder may take any of many forms. For example, a reminder may be rendered as an alarm, popup dialogue box, as an e-mail, as another text message similar to the text message associated with the original reminder, as a chain of text messages including the text message associated with the reminder, as a notification (e.g., in a notification bar or window of a smart phone) or as an audible rendering (e.g., of the content of the reminder or associated text message).

In some embodiments, an activated reminder may be snoozed via user interaction with the user interface of the device rendering the reminder.

Reminders associated with text messages may be integrated into other components and applications. For example, in some embodiments, the reminder may be added as an entry to a calendar component. The reminder may be added as an entry to the calendar component in addition to or instead of being activated as a reminder. In some embodiments, selection of the reminder entry within the calendar component or application may cause the content from the associated text message to be displayed, within the calendar component user interface or within the text messaging component user interface, alternatively.

FIGS. 4-8 illustrate various embodiments of a user interface displayed via display 130 of device 120. The display 130 illustrated in these FIGs. is a touch-sensitive display capable of both displaying user interface elements and receiving input from a user interacting with the display by touching the display with various gestures such as tapping, holding, hovering, swiping, etc. In some embodiments, the device may comprise other components for communicating output and/or receiving input. For example, the device may include audio components (e.g., audio component 290) or motion components (e.g., motion component 295) including accelerometers, gyros or haptics.

FIG. 4 illustrates a text messaging user interface for a mobile device, in embodiments. FIG. 4 illustrates that text message 440 and text message 450 may be displayed via display 130. As illustrated, text message 440 may be a text message received from another device or may be a text message created on device 120 that has been sent to another device, alternatively. Text message 450 is illustrated as either a text message created in device 120, in response to receipt of text message 440 or as a received text message from another device, respectively.

In either embodiment, FIG. 4 illustrates that a user may interact with the displayed user interface elements of the device by touching the display 130 (e.g., with a finger of the user's hand 125). In the illustrated embodiment, the user has tapped the display where the text message 440 is displayed and a pop-up menu with options, option selection 460, has been displayed in response to the tap. For example, display interface 222 and input interface 224 of the text message component 220 may be coordinately configured to display the interface elements and respond to the user's interaction with the display of the elements.

Option selection 460 is illustrated with several user-selectable options. The illustrated options include group/label, which when selected may provide additional user interface elements that the user may interact with to associate a label with text message 440. In some embodiments, labels may be used to group text messages, either messages from the same source or messages from different sources, for example.

The next illustrated option is a calendar option. As described above, various parts of the functionality described herein may be integrated with other components or applications. FIG. 4 illustrates that a calendar application may be integrated with the text message component and that the calendar application may be launched from, accessed via or otherwise integrated with the text message component described herein. In the illustrated embodiment, selection of the calendar option of the option selection 460 may result in display of the appointments from the user's calendar application such that the reminder can be scheduled as to avoid scheduling conflicts, for example. In some embodiments, an entry for the user's calendar application may be pre-populated with content from the text message 440 or 450. For example, the restaurant name, Verde, or the time, 6 pm may be pre-populated in a calendar entry that is displayed to the user in response to selection of the calendar option of option selection 460.

Tag is the third option of the option selection 460. As described above, text messages may be tagged via the user interface of the device as illustrated in FIG. 4. As illustrated in FIG. 4, access to, or integration with such other applications may be provided via the user interface of the text message component illustrated in FIG. 4. Reservation is the fourth option of the option selection 460. In some embodiments, the text messaging component may be integrated with any of various reservation-making applications. The fifth option of the option selection 460 is a Reminder option. As described above, association of a text message with a reminder may be instructed by any of various interactions between a user and a device. The illustrated embodiment shows that the instruction to associate the text message with a reminder may be initiated via a user interface element such as option selection 460. The last option in the list of options of option selection 460 is a custom option. Selection of the custom option may cause display of user interface elements designed to accept instructions from a user that customize what other applications or functionality may be launched or accessed from the option selection 460 (e.g., what options are included in the list for option selection 460).

Figure 5:
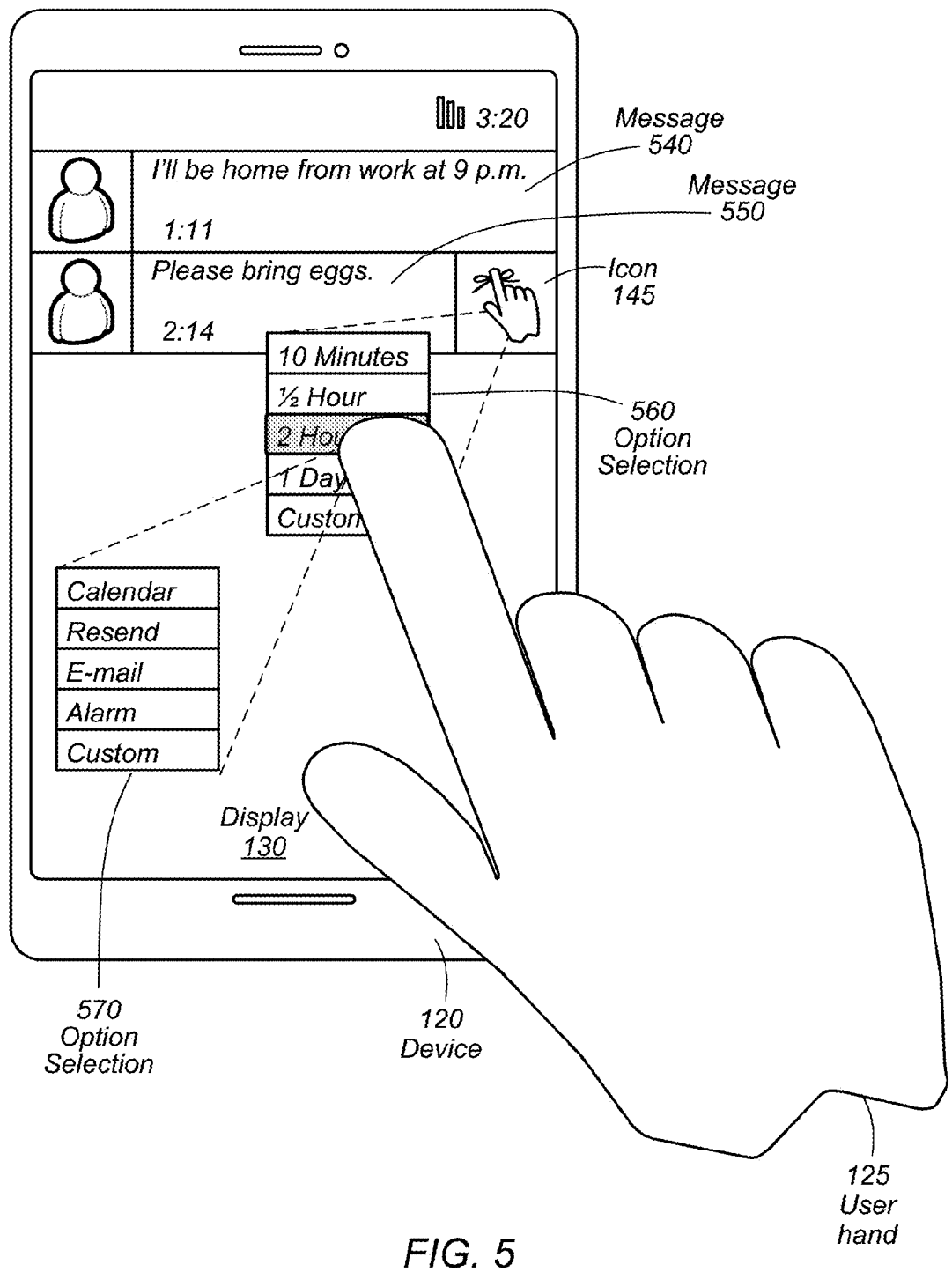
FIG. 5 illustrates of a text messaging application for a mobile device, according to one embodiment.

FIG. 5 illustrates another embodiment of a text messaging application for a mobile device. In the illustrated embodiment, icon 145 is displayed with text message 550. The user has selected icon 145 by tapping on the display 130 where the icon 145 is displayed and an option selection 560 has been responsively displayed. Option selection 560 is illustrated with five time period options, 10 Minutes, ½ Hour, 2 Hours, 1 Day and Custom. In the illustrated embodiment, the user has also tapped on display 130 where the 2 Hour option of the option selection 560 is displayed and another option selection 570 has been displayed on display 130 in response to the user's selection of the 2 Hour option in option selection 560.

Option selection 570 includes user-selectable options calendar, resend, e-mail, alarm and custom. In the illustrated embodiment, selection of the calendar option causes a response similar to the response described for the same option in FIG. 4. In this particular illustration, selection of the calendar option may cause creation and display of a calendar entry pre-populated with reminder activation time in 2 hours. The other options, resend, e-mail and alarm, represent options for how the reminder may be rendered at the scheduled time. Selection of any one of these options may cause instructions to be sent to the reminder module 230 of the text message component or to another application, instructing the component or application to create a reminder for activation at the selected time and to render the reminder in the form selected (e.g., either resending the same or similar text message, generating an email that may be sent or received, or activating an alarm such as an visual alarm message or an audible alarm. Selection of the custom option of the option selection 570 may cause interface elements to be displayed that facilitate receipt of instructions from a user to add another type of reminder rendering or other functionality as an option on the option selection 570.

FIG. 6 illustrates one embodiment of a reminder interface for a mobile device. In the illustrated embodiment, display elements of a reminder user interface are displayed via display 130 of device 120. Reminder 640 and reminder 650 are illustrated, with reminder 650 illustrated as being selected by the user. Reminder 640 is illustrated with title 660, flag 655 and time characteristic 665, Tonight. Reminder 650 is illustrated with title "Happy Hour at Louie's", time characteristic Friday, Happy Hour, and a selectable calendar icon 657 (selection of the calendar icon 657 may cause the calendar application to launch, in some embodiments). In one embodiment, reminder 650 is activated (e.g., by control module 232) prior to the time of the illustrated display time (e.g., prior to 4:20). In response to the activation, instructions may be sent to display interface 222 to display the reminder via the illustrated reminder interface of FIG. 6. In the illustrated embodiment, display 130 displays the reminder and the user selects the displayed reminder 650. Upon selection of the reminder 650, an input interface (e.g., input interface 224) may receive an indication of the selection of the reminder 650 and pass the indication to a module (e.g., reminder module 230). The module that receives the indication may respond to the receipt of the indication by instructing display of the text message associated with the reminder. In some embodiments, the instructions may direct display of the group or chain of messages corresponding with the text message associated with the reminder. For example, the display may be instructed to display the chain of text messages including the text message associated with the reminder, scroll to the particular text message associated with the text message, and/or to highlight the particular associated text message among the other corresponding text messages of the text message chain.

In the illustrated embodiment, selection of the reminder 650 causes instructions to be sent that direct the display 130 to display the associated message among corresponding messages of the chain in the lower portion of the display 130.

In another embodiment, where the reminder is rendered in different forms (e.g., as an e-mail) the reminder itself may be rendered and selection of the reminder may cause rendering of the text message associated with the reminder. In other embodiments, the text message itself may be rendered when the reminder is activated, instead of the reminder, for example.

Figure 7:
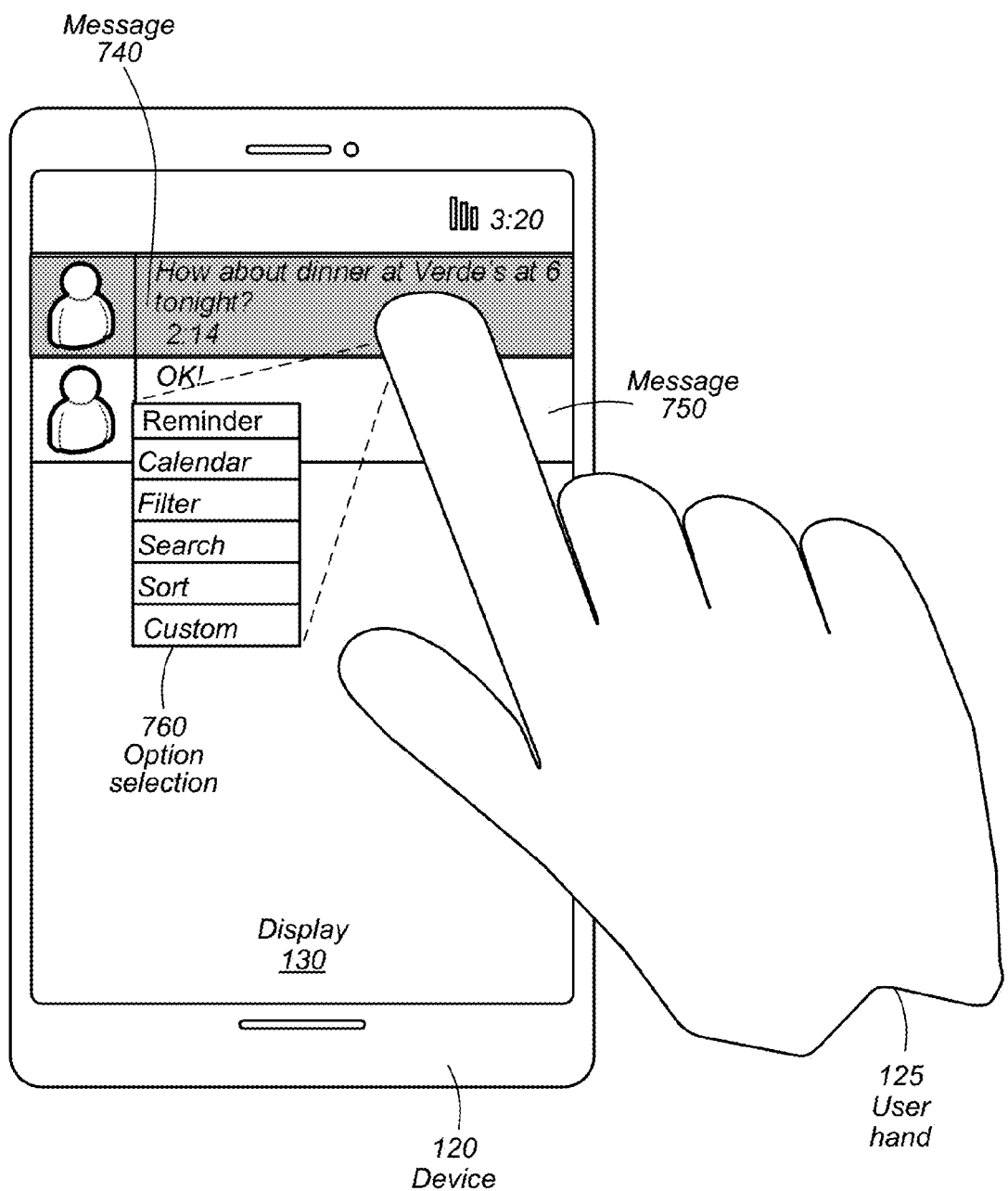
FIG. 7 illustrates a text messaging application for a mobile device, according to one embodiment.

FIG. 7 illustrates another embodiment of a reminder interface for a mobile device. FIG. 7 illustrates that multiple types of functionality may be accessed via user interface elements of the display of device 120. For example, option selection 760 is illustrated with the same reminder, calendar and custom options described above, but also with filter, search and sort options. In some embodiments, the text message component may provide access to these and other types of functions via the interface elements similar to those illustrated while in other embodiments, and access to a particular one of the functions may be accessed directly by selecting the text message, without display of additional interface elements, in embodiments. For example, instead of displaying option selection 760 in response to the user's tapping of the text message 740, the device may respond to the user's tapping on the text message 740 by sorting, filtering or searching other text messages based on one or more characteristics of the text message 740.

For example, selection of the text message may cause the text message component 220 to search through other text messages (e.g., other text messages stored in text message data 240) for messages from the same sender or for messages with similar content. The results of the search may be displayed (e.g., via display 130) to the user in response to the selection (not illustrated).

In some embodiments, access to various functionality described herein may be provided via a pull down menu selected by swiping downward, upward or to the side on the display.

In some embodiments, searching, filtering or sorting may be based on a title, label, tag or flag that has been associated with a text message. For example, user interface elements may be displayed that prompt a user to select a search for all of the flagged messages for a particular contact. In some embodiments, the results may be displayed (e.g., without display of any non-flagged messages) for the particular contact.

FIG. 8 illustrates another reminder interface for a mobile device, according to one embodiment. In the illustrated embodiment, display 130 of device 120 is displaying user interface elements of a user interface. Reminder 850 and reminder 855 are displayed and reminder 850 is highlighted because the user has selected reminder 850 by tapping on the display screen where the reminder 850 is displayed. Option selection 860 is illustrated with various user-selectable options such as calendar, snooze, search, send to device and send to contact.

FIG. 8 illustrates devices 810, 820 and 830 next to users 815 and 825. In some embodiments, device 810 corresponds with user 815 and device 820 corresponds with user 825 and device 830 is another device that corresponds with the user (associated with user hand 125) that is illustrated as interacting with the display of device 120. In some embodiments, users 815, 825 may correspond to contacts. Other arrangements and associations among the devices and users are contemplated. Device 120 and devices 810, 820 and 830 may communicate via network 840. Network 840 may be any type of wired or wireless network such as a cellular network, WAN, LAN or the Internet, for example.

In the illustrated embodiment, the "send to device" option of the option selection 860 is shaded to illustrate that is has been selected by the user's tapping on the display 130 where the option was displayed. In some embodiments, selection of the "send to device" option may cause instructions or a request to be sent that result in the reminder 850 being sent to another device. For example, reminder 850 may be sent to device 810, 820, 830, another device such as the user's PC, or any other device. Selection of the "send to contact" option of the option selection 860 may cause the selected reminder to be sent to a contact, for example, user 815, via one or more devices associated with user 815.

Figure 9:
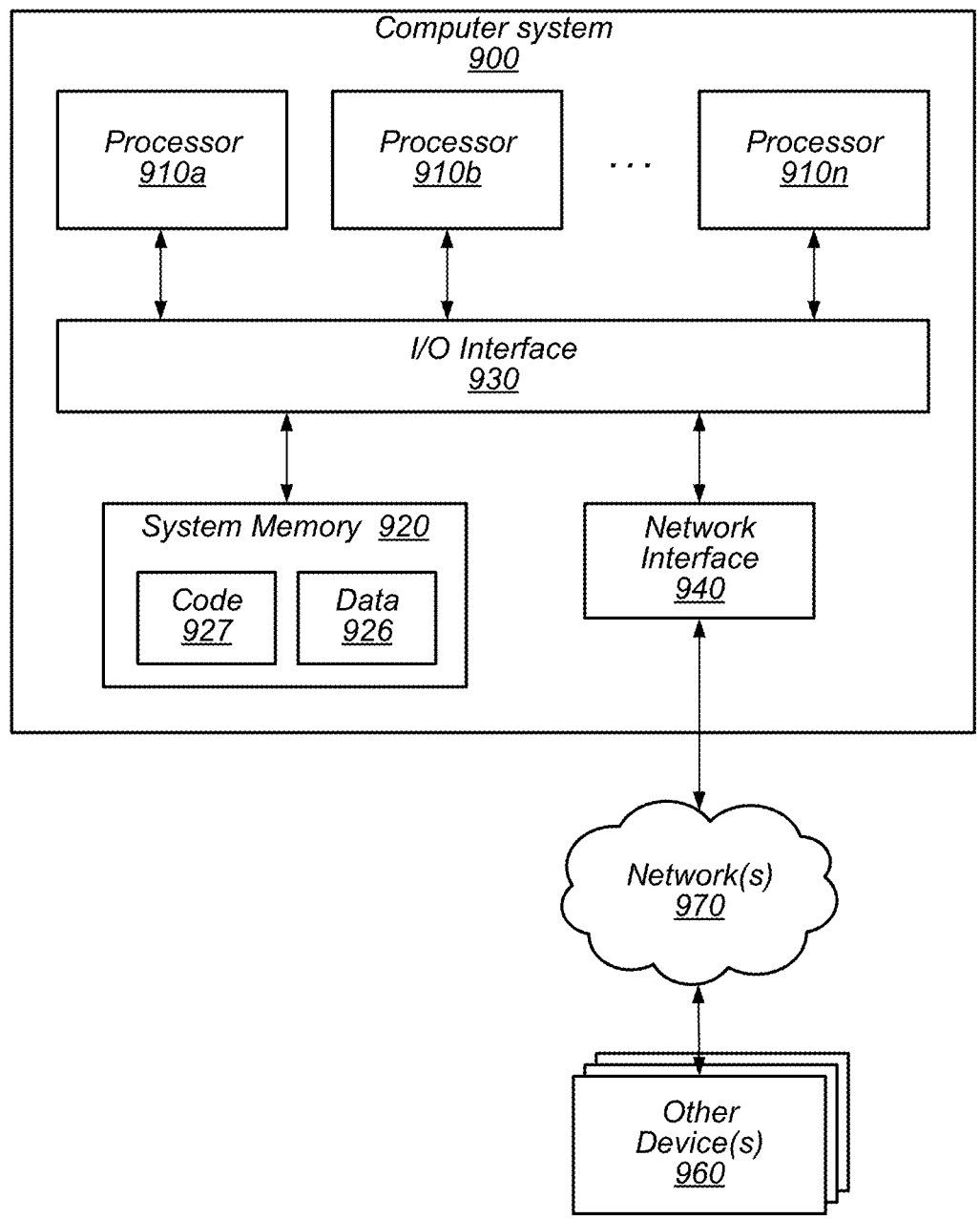
FIG. 9 illustrates a computing system, according to some embodiments.

In some embodiments, a device that implements a portion or all of one or more of the technologies, including but not limited to the various reminder-enabled text messaging processes and devices as described herein, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, MIPS ISAs, RISC or any other suitable ISA, such as systems-on-chips (SoC). In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for transferring data over a network, are shown stored within system memory 920 as code 927 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 970, such as other computer systems or devices as illustrated in FIGS. 1 through 8, for example. In various embodiments, network interface 940 may support communication via any suitable wired or wireless general data networks, such as cellular networks, Ethernet networks, or Wi-Fi networks for example. Network interface 940 may support communication via telecommunications/telephony networks such as analog voice networks or digital fiber communications networks, via storage area networks such as Fiber Channel SANs, or via any other suitable type of network and/or protocol.

In some embodiments, system memory 920 may be one embodiment of a computer-accessible medium configured to store program instructions and data for implementing embodiments of data transfer and storage methods as described above relative to FIGS. 1-8. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A portable device, comprising:
   a display;
   one or more processors; and
   a scheduler of a text messaging application implemented by program instructions when executed by the one or more processors, wherein the text messaging application is distinct from an e-mail-based application, the scheduler of the text messaging application configured to:
   instruct display of one or more received short message service text messages on the display, wherein the one or more received short message service text messages are received by the portable device according to a short message service text messaging protocol;
   provide a reminder user interface for associating a reminder with a selected one of the one or more displayed short message service text messages;
   receive, via the reminder user interface, input to associate the reminder with the selected text message;

in response to receipt of the input, associate the reminder with the selected text message, wherein the reminder is also associated with a scheduled time;

instruct activation of the reminder at the scheduled time, wherein the instructed activation causes display of the reminder and the displayed reminder includes at least some of the content from the selected text message that was received by the portable device;

display a plurality of user interface elements that correspond to the one or more text messages, wherein each of the plurality of user interface elements are associated with one selected from associate a title with the reminder, associate a label with the reminder, or associate a tag with the reminder;

receive user input that indicates a selected one of the plurality of user interface elements; and perform a function that corresponds to the selected one of the user interface elements, wherein the function corresponds to said one selected from associate the title with the reminder, associate the label with the reminder or associate the tag with the reminder.

2. The portable device as recited in claim 1, wherein the text messaging application is further configured to create a reminder entry for the reminder associated with the selected text message.

3. The portable device as recited in claim 2, wherein the reminder entry comprises at least a portion of the selected text message, and wherein the text messaging application is further configured to display the at least a portion of the selected text message at the scheduled time for the reminder.

4. The portable device as recited in claim 1, wherein the display comprises a touch-sensitive display, and wherein the input to associate the reminder with the selected one of the one or more displayed text messages is received via the touch-sensitive display while the touch-sensitive display is displaying the reminder user interface of the text messaging application.

5. The portable device as recited in claim 4, wherein the messaging application is further configured to:

receive an indication of the scheduled time for the reminder via the touch-sensitive display while the touch-sensitive display is displaying the reminder user interface of the text messaging application; and wherein to instruct activation of the reminder at the scheduled time, the text messaging application is configured to instruct display of the reminder associated with the selected text message in accordance with said received scheduled time.

6. A method, comprising:

performing, by one or more processors:

instructing, by a text messaging application that is distinct from an e-mail-based application, display of one or more short message service text messages via a user interface of the text message application, wherein the one or more text messages were received by the text message application;

receiving, by the text messaging application a request to associate a reminder with a selected one of the one or more displayed text messages;

in response to receipt of the request, associating the reminder with the selected text message, wherein the reminder is also associated with a scheduled time;

in response to the one or more processors instructing activation of the reminder associated with the selected text message at the scheduled time, instructing display of the reminder, wherein the displayed reminder includes at least some of the content from the selected text message that was received by the text message application;

displaying a plurality of user interface elements corresponding to the one or more text messages;

receiving user input indicating a selected one of the plurality of user interface elements; and performing a function corresponding to the selected one of the user interface elements, wherein the function is one selected from associating a title, associating a label or associating a tag with the reminder.

7. The method of claim 6, wherein said receiving the request to associate the reminder with the selected text message comprises receiving the request from a touch-sensitive display while the touch-sensitive display is displaying the user interface of the text message application.

8. The method of claim 7, wherein said receiving the request to associate the reminder comprises recognizing one of a tap gesture, a multi-tap gesture, a press and hold gesture, an icon selection, a user interface element selection, a menu selection, or motion gesture associated with the selected text message.

9. The method of claim 6, further comprising providing an interface for generating the reminder in another application subsequent to receiving the request.

10. The method of claim 6, further comprising determining the scheduled time for activation of the reminder based on a default time, a configuration setting configured prior to said receiving the request to associate the reminder with the selected one of the displayed text messages, or input received after or as part of receiving the request.

11. The method of claim 6, wherein associating the reminder with the selected text message comprises creating a link between the reminder and the selected text message, and wherein the method further comprises in response to said instructing activation, displaying the reminder and an interface element, the interface element associated with the link between the reminder and the selected text message and wherein said instructing display of at least some of the content from the selected text message that was received by the text message application is performed in response to receiving input indicating selection of the interface element.

12. The method of claim 6, further comprising:

displaying a plurality of text messages;

receiving input setting a tag for one or more of the plurality of text messages; and performing one selected from searching, filtering or ordering at least some of the plurality of text messages based at least in part on the tag.

13. A non-transitory computer-readable medium storing program instructions that when executed by one or more processors implement a text message application that is distinct from an e-mail-based application, the text message application configured to perform:

instructing display of one or more short message service text messages via a user interface of a text message application, wherein the one or more text messages were received by the text message application;

receiving a request to associate a reminder with a selected one of the one or more displayed text messages;

in response to receipt of the request, associating the reminder with the selected text message, wherein the reminder is also associated with a scheduled time;

in response to the text message application instructing activation of the reminder associated with the selected text message at the scheduled time,
   instructing display of the reminder, wherein the displayed reminder includes at least some of the content from the selected text message that was received by the text message application;
displaying a plurality of user interface elements corresponding to the one or more text messages;
receiving user input indicating a selected one of the plurality of user interface elements; and
performing a function corresponding to the selected one of the user interface elements, wherein the function is one selected from associating a title, associating a label or associating a tag with the reminder.

14. The non-transitory computer-readable medium as recited in claim 13,
   wherein the program instructions further implement an application programming interface of the text message application for programmatically accessing a reminder creation module of one or more other applications; and
   wherein the text message application is further configured to perform launching, via the application programming interface and in response to said receiving the request, the reminder creation module of the one or more other applications.

15. The non-transitory computer-readable medium as recited in claim 13, wherein the text message application is further configured to perform:
   in response to receiving the request,
      displaying a plurality of user interface elements;
      receiving user input indicating a selected one of the user interface elements; and
      performing a function corresponding to the selected one of the user interface elements, wherein the function is one selected from sending an indication of the reminder to another device or sending an indication of the reminder to another user.

16. The non-transitory computer-readable medium as recited in claim 13, wherein the text message application is further configured to perform:
   displaying a plurality of user interface elements corresponding to the one or more text messages;
   receiving user input indicating a selected one of the plurality of user interface elements; and
   performing a function corresponding to the selected one of the user interface elements, wherein the function is one selected from associating a title, associating a label or associating a tag with the reminder.

17. The non-transitory computer-readable medium as recited in claim 13, wherein the program instructions are further configured to perform:
   analyzing a content of the one or more text messages;
   recognizing, based on the analysis of the content, an opportunity to provide one or more additional user interface options corresponding to functionality in one or more other applications;
   displaying one or more user interface elements corresponding to the one or more additional user interface options; and
   instructing, based upon selection of the one or more user interface elements, the one or more other applications to launch.

18. The non-transitory computer-readable medium as recited in claim 13 wherein the text message application is further configured to perform:
   analyzing a content of the selected text message to determine a reminder opportunity; and
   instructing display of a prompt indicating the reminder opportunity, wherein said request to associate the reminder with the selected text message is based upon user-selection of the prompt indicating the reminder opportunity.

19. The non-transitory computer-readable medium as recited in claim 13 wherein the instructing activation of the reminder at the scheduled time comprises:
   re-displaying the selected text message via the display;
   rendering content of the selected text message audibly;
   generating an e-mail message comprising content from the selected text message;
   displaying a pop-up message comprising content from the selected text message; or
   instructing rendering of the reminder or content based on the selected text message via another application.

\* \* \* \* \*